Patented Sept. 2, 1924.

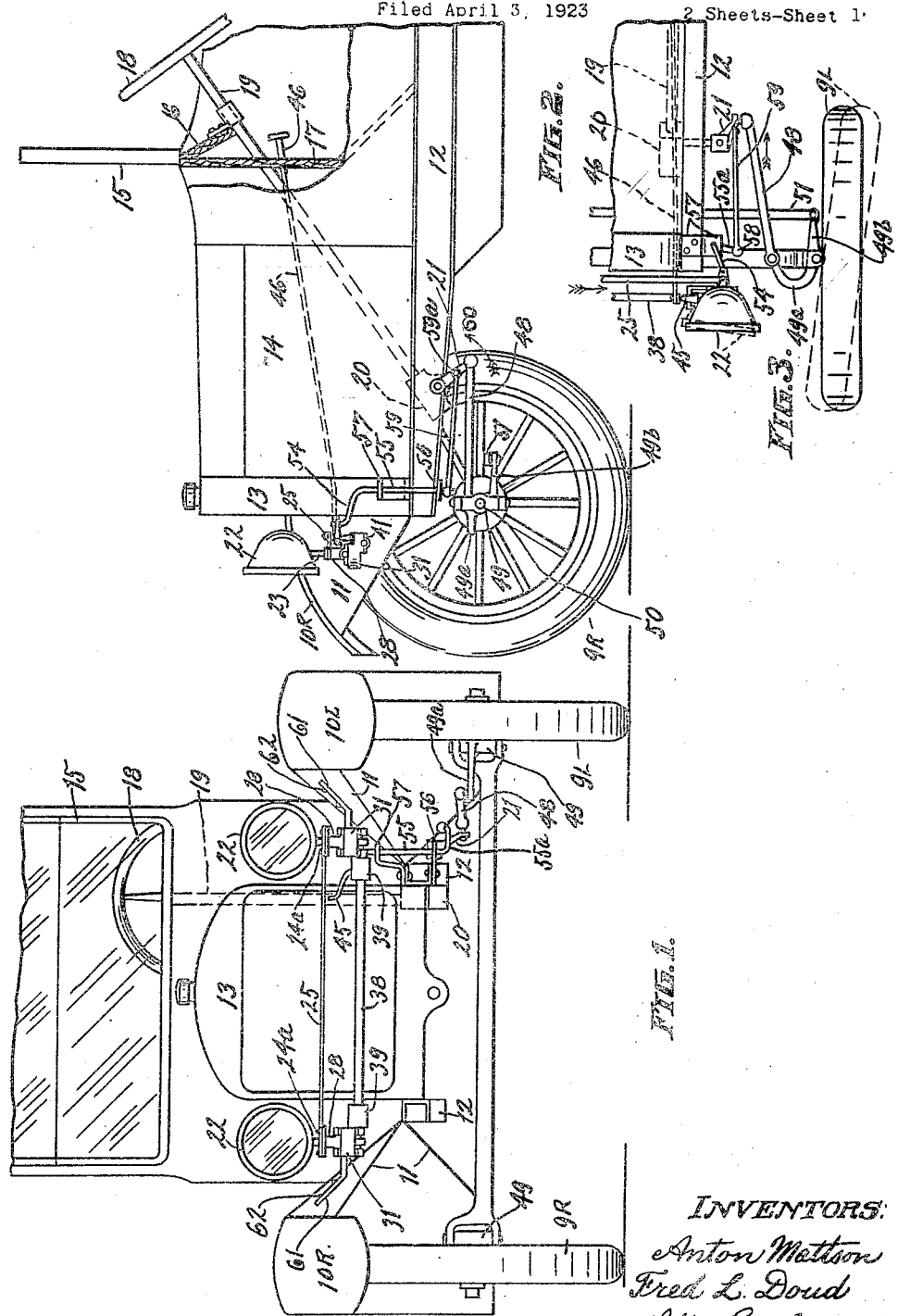

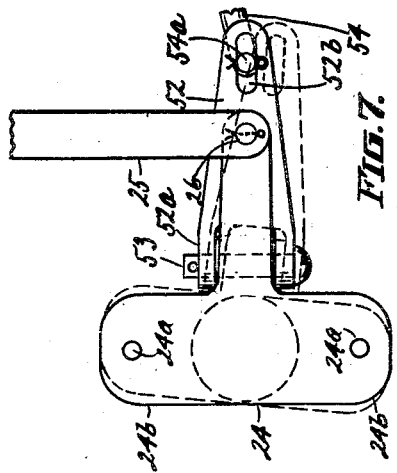

1,507,241

UNITED STATES PATENT OFFICE.

ANTON MATTSON, OF MINNEAPOLIS, AND FRED L. DOUD, OF ST. PAUL, MINNESOTA.

HEADLIGHT CONTROL FOR AUTOMOBILES.

Application filed April 3, 1923. Serial No. 629,595.

*To all whom it may concern:*

Be it known that we, ANTON MATTSON, a citizen of the United States, residing at Minneapolis, in the county of Hennepin and State of Minnesota, and FRED L. DOUD, a citizen of the United States, residing at St. Paul, in the county of Ramsey and State of Minnesota, have invented certain new and useful Improvements in Headlight Control for Automobiles, of which the following is a specification.

Our invention relates to headlight control devices for motor driven vehicles and the object is to provide a simple, reliable and efficient device by means of which the two headlights of an automobile are always directed to throw light forward of the car in the direction the front wheels of it are moving. A further object is to provide means for simultaneously tipping the headlights in a vertical plane for the purpose of throwing beams of light on the road forward of the car at variable distances without throwing a glaring light in the eyes of pedestrians.

In the accompanying drawings:—

Fig. 1 is a front view of an automobile with our invention applied to its headlights.

Fig. 2 is a left side elevation of the automobile illustrated in Fig. 1, the left front wheel and fender being omitted to disclose our device.

Fig. 3 is a top view of the front left side portion of Fig. 1 with the left front wheel restored.

Fig. 4 is an enlarged top view of the left half of our device which turns and tilts the headlights of an auto, some minor parts being omitted.

Fig. 5 is a partly sectional front elevation of Fig. 4 and a part of a headlight in operative position.

Fig. 6 is an enlarged vertical section on line 6—6 in Fig. 5 showing the headlight turning and tilting mechanism.

Fig. 7 is a top view of the upper portion of Fig. 6.

Fig. 8 is an enlarged sectional detail of the dash board 17 and showing the rear end of the headlight tipping rod of our device.

Fig. 9 is an enlarged detail view of the washer 33 in Fig. 6.

Referring to the drawings by reference numerals, $9^R$ and $9^L$ are, respectively, the front right and left wheels of an auto having corresponding mud guards $10^R$ and $10^L$ having each the usual apron 11 secured to the main frame channels 12. 13 is the radiator, 14 the engine hood, 15 the wind-shield, 16 the instrument board, 17 the dash board, 18 the steering wheel, 19 the steering wheel column and 20 the worm gear housing in which is the usual worm mechanism (not shown) operating the steering arm 21 (see Fig. 2) in a vertical plane in longitudinal direction of the car, and 22 are the two front headlights in the customary location between the radiator and the mud guards.

In our device each headlight has its pedestal 23 secured, as at $24^a$ in Figs. 1, 5 and 7, to the arms $24^b$ of a horizontally disposed T-shaped member 24, the T having its leg $24^c$ projecting rearwardly, the rear ends of said legs $24^c$ are connected by a rod 25 pivotally secured as at 26. Said member 24 has a vertically disposed, integral, downwardly extending shank 27 rotatably held in a vertically disposed cylindrical casting 28 having two oppositely arranged stub shafts 29 adapted to oscillate in bearings 30 of a U-shaped metal frame 31, said oscillating movement being in a vertical plane longitudinally of the car.

The member 28 has an upper, small bore to receive shank 27 of member 24 and its lever portion has an enlarged bore 32 (see Fig. 6) the bottom of which is engaged by a non-rotatable washer 33, the shank 27 being threaded within said bore and has a key slot 34 engaged by a lip $33^a$ (see Fig. 9). 35 is a nut adapted to hold the washer 33 in contact with the bottom of the enlarged bore 32. The lower end of member 28 has two diametrically opposite arms $28^a$ facing similar cams $28^b$ of a member 36 adapted to close the lower end of member 28 and has a square bore through which extends the correspondingly shaped lower portion $27^a$ of shank 27, the latter terminating in a reduced threaded portion $27^b$ for a nut $27^c$. A compression coil spring 37 encircles the shank portion $27^a$ and is partly compressed between the member 36 and a washer 38 resting on the nut $27^c$. The latter nut serves to regulate the compression of the spring to such a degree that the cams $28^a$, $28^b$ at all times tend to turn and hold the headlights in a straight, forwardly facing position.

By moving the connecting rod 25 endwise either to left or right, by means operatively connected with the steering arm 21, the headlights may be turned as the auto is turned, overcoming the pressure of the springs 37. The means used for this purpose and the means for tilting the two headlights in a vertical direction simultaneously, and independent of the horizontal turning will now be described.

The two U-shaped frames 31 are firmly connected by a tubular bar 38 extended horizontally across and in front of the radiator 13. The opposite ends of said bar are each secured in a rectangular frame portion 39 of the adjacent U-frame 31. Extending through said tubular bar 38 is a light shaft 40 having its end portions journaled in bearings 41 on the under side of the U-frame 31.

Between the arms of each U-frame we secure on said shaft an eccentric 42 engaging an eccentric strap 43 having an upwardly extending rod 43ª pivotally secured at 44ª to an arm 44 on the rear side of the cylindrical member 28. It will be readily understood that when the shaft 40 is oscillated the eccentric will move the arm 43 in a vertical plane and arm 44 of member 28 will rock the latter in its bearings 30 and consequently the headlights will be rocked vertically. The oscillating of shaft 40 is accomplished by a rocker arm 45 keyed on the shaft within either of the rectangular frames 39 (see Fig. 4) and extending upwardly therefrom its upper end pivotally connected to the front end of a rod 46 extending rearwardly through the dash-board 17 and terminating within reach of the driver. A plate 47 (see Fig. 8) may be secured on the dash-board, and the bar 46 may be notched as at 46ª, in Fig. 8, on its under side to engage the upper edge of the plate. Thus the driver may push or pull on the rod 46 to adjust the headlights vertically to any desired angle and then drop the bar on the upper edge of the plate 47 which engages one of the notches and holds the rod until the driver wishes to make another adjustment.

The means for turning the headlights horizontally in the direction which the front wheels are headed, will vary according to the type of steering gear used, but we have illustrated the type in which the steering arm 21 oscillates in a vertical plane longitudinally of the auto, any variation required for other types of steering gear we consider merely a mechanical equivalent and expedient which will come under the scope and spirit of our invention.

The steering arm 21 is suitably connected to the rear end of a drag-link 48, the front end of which is connected to the steering arm 49ª of one of the steering wheel knuckles 49, each of the latter having a skein 50 for its front wheel (see Figs. 1, 2 and 3). 49ᵇ are the usual arms of the steering knuckles connected by the cross link 51.

On the under side of the leg 24ᶜ of one of the T-shaped members 24 is provided a lug 24ᵈ straddled by the forked forward end 52ª of a lever 52, which by a pin 53 through it and the lug, forms a joint allowing the lamp support 24—24ª—24ᵇ to tilt without tilting the lever 52. The rear end of said lever 52 is flattened and has a longitudinal slot 52ᵇ (see Fig. 7) engaged by a vertically disposed end 54ª of a lever 54 on the upper end of a vertically disposed shaft 55 journaled in brackets 56—57 suitably secured on the auto frame channel 12 (see Figs. 1, 2 and 3). The lower end of said shaft 55 has another radial arm 55ª with a ball joint 58 connecting it with the forward end of a link 59. The rear end of said link 59 is pivotally secured at 59ª to the steering arm 21 (Figs. 1, 2 and 3). Thus, for example, when the auto is being turned to the right the steering arm 21 will move in the direction of arrow 60 (Fig. 2) pulling rod 59 rearwardly and rotating shaft 55 and its upper arm 54 so that the end of the latter engaging the slotted part of arm 52 on the lamp turning mechanism will turn said arm (52) to the left and the headlight being mounted forward thereof will be turned to throw its light toward the right and in the direction the front wheels of the car are headed (see dotted lines of the left hand front wheel and corresponding position of headlight in Fig. 3). It will be readily understood that in the above described turning, the square part 27ª of shaft 27 under each headlight will force the cam-like member 36 to be forced down on the angular lower faces of member 28, thus forcing the cam member downwardly from the upper member, but this is permitted by the yielding of the coil spring 37. When the front ground wheels are being returned to their normal straight position the springs 37 will force the cam members 36 back to their original position.

61 in Figs. 1 and 5, are brackets, either formed integral with the U-frames 31 or detachably secured thereto. They extend angularly from said U-frame and are perforated for rivets 62 or like means for securing the device to the angular faces of the opposite aprons 11 or to the brackets (not shown) which support the front mud guards.

The operation of our device has already been disclosed in the above description but it may be further stated and will be readily seen that with our device headlights throwing concentrated beams of light forward of the car are particularly desirable. The said beams of light may be used exclusively to light up the road ahead of the car. No broad side light from the headlights is necessary because a wide range of light is not needed, the headlights automatically changing the direction of the light as the car is turned. This avoids unnecessary glare in the eyes of pedestrians or persons in other cars. With our device the light may be thrown forward of the car any desired distance, thus readily complying with the various laws in different localities regulating such distances.

What we claim is:

1. In combination a pair of headlights each mounted for vertical and horizontal swinging movement, a T-shaped horizontally disposed bracket for supporting each lamp one arm of each bracket extending rearwardly, operative connection between said arms, a vertically disposed shaft on each bracket rotatably mounted in a vertically tiltable housing, means for simultaneously tilting said housings and the lamps supported thereon, means involving a vertically tiltable link pivoted on the T-shaped member for turning the lamps horizontally, operative connection between said link and the steering mechanism of an automobile for turning the lamps in accordance with the steering wheels of the automobile.

2. The structure specified in claim 1, in which said vertically tiltable link is pivoted adjacent and parallel to the rearward arm of one of said T-shaped brackets, said link having an elongated slot in its rear end, a vertically arranged rock shaft with one rocker arm engaging in said slot, said operative connection with the steering mechanism of an automobile comprising a second rocker arm on said rock shaft and a link connecting said latter arm with a movable part of the steering mechanism.

In testimony whereof we affix our signatures.

ANTON MATTSON.
FRED L. DOUD.